United States Patent Office 2,824,843
Patented Feb. 25, 1958

2,824,843

TREATMENT OF CALCIUM NICKEL PHOSPHATE-CONTAINING CATALYSTS

Andrew J. Dietzler and Charles R. Noddings, Midland, and John W. Corey, Sanford, Mich., assignors to The Dow Chemical Company, Midland, Mich., a corporation of Delaware No Drawing. Application February 20, 1953
Serial No. 338,146

4 Claims. (Cl. 252—437)

This invention concerns a method of treating solid dehydrogenation catalysts comprising calcium nickel phosphate as the principal, and essential, ingredient to improve their effectiveness in selectively catalyzing the thermal dehydrogenation of hydrocarbons, especially normal butylenes, without causing extensive cracking, or other decomposition, of the hydrocarbons.

The catalysts with which the invention is concerned, and methods of making the same, are described in U. S. Patents Nos. 2,456,367, 2,456,368 and 2,542,813. They comprise a calcium nickel phosphate containing an average of from 6.5 to 12, preferably from 7.5 to 9.2, atoms of calcium per atom of nickel, the total amount of calcium and nickel being sufficient to satisfy the valences of the phosphate radical. The are prepared by admixing corresponding proportions of water-soluble calcium and nickel salts and a water-soluble ortho-phosphate in a neutral to alkaline aqueous medium, whereby the calcium nickel phosphate material is formed as a suspension of small particles that settle as a lower layer, or a precipitate; and removing, water-washing, and drying the precipitate. The calcium nickel phosphate is then in the form of small particles or a fragile chalky body of such particles. It can be used directly in such form as a dehydrogenation catalyst, but is usually pressed into the form of pellets or granules of sizes more convenient for use. This is accomplished by admixing the calcium nickel phosphate with a removable binder such as graphite or a mineral oil; pressing the mixture into granules or pellets suitable for use as a dehydrogenation catalyst; and removing the binder, e. g. by heating the pellets in a current of air or a mixture of steam and air to oxidize the binder. Frequently, a minor amount of chromium oxide is admixed with the calcium nickel phosphate, e. g. prior to, or during, formation of the pellets. The catalyst may consist of the calcium nickel phosphate, or may comprise the calcium nickel phosphate and a minor amount of chromium oxide.

The catalysts thus prepared are highly effective in catalyzing the thermal dehydrogenation in the presence of steam of certain hydrocarbons, especially aliphatic monoolefines having four or more carbon atoms in a chain containing th eolefinic linkage, and more particularly normal butylenes such as 1-butylene, 2-butylene, and mixtures thereof. For instance, 1,3-butadiene is manufactured by passing a vapor mixture of steam and either or both of the normal butylenes through a bed of such granular catalyst at temperatures of from 600° to 700° C. During such manufacture, the feed of butylene is periodically interrupted and air, or a mixture of steam and air, is passed through the bed at temperatures between 450° and 700° C., e. g. for from 10 to 30 minutes, in order to oxidize and remove carbonaceous deposits that accumulate in the catalyst bed.

The desired catalytic dehydrogenation, e. g. of normal butylenes to form 1,3-butadiene, is accompanied at least to a minor extent by one or more undesired side-reactions such as carbonization of hydrocarbons, occurrence of a water-gas reaction to form carbon monoxide and hydrogen, and cracking of carbon-to-carbon linkages in the hydrocarbon molecules with formation of hydrocarbons of lower molecular weight such as methane or ethylene. The percent of the normal butylenes consumed in the reaction under standard test conditions, i. e. the total percent conversion obtained, is a measure of the total activity of the catalyst. The percent yield of 1,3-butadiene, based on the amount of normal butylenes consumed under standard test conditions, is a measure of the selectivity, i. e. the selective activity, of the catalyst. The term "selectivity" as hereinafter employed carries the meaning just given.

The effectiveness of such catalysts in catalyzing the thermal dehydrogenation of normal butylenes without causing appreciable cracking or carbonization of the $C_4$ hydrocarbons is dependent on a number of factors, particularly the care and skill used in making the catalyst and the time and conditions under which the catalyst has been used in the dehydrogenation reaction. Poor mixing of the reactants used in making the calcium nickel phosphate often results in formation of a highly active "wild" catalyst that causes considerable cracking and/or carbonization of the $C_4$ hydrocarbons concurrently with the desired dehydrogenation of the normal butylenes to form 1,3-butadiene. Even a carefully prepared calcium nickel phosphate catalyst usually is less selective in causing the dehydrogenation reaction rather than such side reactions when it is first employed in the process for the manufacture of 1,3-butadiene than after it has been used for a month or thereabout. Accordingly, considerable amounts of butylenes are lost due to occurrence of the side reactions during the first few weeks of use of a bed of new catalyst. The calcium nickel phosphate catalysts are long-lived, but after prolonged use, e. g. for six months or more, they gradually lose their activity in causing the desired dehydrogenation reaction and frequently become more active in causing undesired side reactions such as cracking or carbonization of the $C_4$ hydrocarbons.

It is an object of this invention to provide a method of treating the aforementioned calcium nickel phosphate-containing catalysts so as to increase their effectiveness in selectively catalyzing the thermal dehydrogenation of normal butylenes without causing extensive occurrence of side reactions. A particular object is to provide such method for the treatment of an unused calcium nickel phosphate catalyst to increase the selectivity which it displays when put in service for the manufacture of 1,3-butadiene from a normal butylene. Another object is to provide such method for the treatment of calcium nickel phosphate catalysts to increase the active life of the same. A further object is to provide such method for the treatment of a calcium nickel phosphate catalyst that has become partially spent due to use in a dehydrogenation process, so as to increase the selectivity and effectiveness of the same in such process. Other objects will be evident from the following description of the invention.

It has been found that the selectivity of any of the aforementioned calcium nickel phosphate-containing catalysts, in catalyzing the dehydrogenation of normal butylenes or other hydrocarbons in the presence of steam rather than causing cracking or carbonization of the hydrocarbons, can be improved by subjecting the catalyst, in a form substantially free of carbon or carbonaceous deposits, to a heat-treatment hereinafter described. The heat-treatment can be applied to such catalyst prior to employment of the latter in a dehydrogenation process or it can be applied to a calcium nickel phosphate-containing catalyst that has decreased in selectivity due to use in a dehydrogenation process. In either such instance, the selectivity of the catalyst can be improved considerably. However, it is important that the catalyst be substantially free of carbon-containing materials, e. g. of elemental carbon and carbonaceous deposits, when heat-treated in accordance with the invention. The treatment causes little, if any, improvement when the catalyst is intimately admixed with carbon or solid carbonaceous deposits.

According to the invention, a calcium nickel-phosphate-containing catalyst which is substantially free of elemental carbon and of carbon containing materials, or which has been rendered free of such contaminants, e. g. by a preliminary burn-off operation, is heated, in contact with steam and/or an oxygen-containing gas such as oxygen or air, at temperatures of from 650° to 800° C., preferably from 675° to 750° C., for one hour or longer. The heating may be done in an oven without deliberate passage of a gas through the bed of catalyst, but this sometimes results in an improvement in catalytic selectivity that is short-lived, i. e. that is evident when the treated catalyst is placed in service in a dehydrogenation process but declines after several hours use of the catalyst. By passing steam, air, or oxygen, or a mixture of steam and air through the bed of carbon-free catalyst during heat-treatment of the latter, there is obtained an increase in catalytic selectivity that endures for a longer time after the heat-treated catalyst is placed in service in a dehydrogenation process. The rate at which steam, air, or oxygen is passed through the catalyst during the heat-treatment may be varied as widely as desired.

The fact that the heat-treatment is not satisfactorily effective when applied to a calcium nickel phosphate catalyst having carbon or carbonaceous solids intimately admixed therewith and that the treatment is most effective in causing a durable increase in catalyst selectivity when it is carried out while passing steam and/or an oxygen-containing gas through the catalyst bed indicates that the treatment causes a partial oxidation of the catalyst, e. g. by raising the valence of part of the nickel in the calcium nickel phosphate from 2 to 3, and that the improvement in selectivity of the catalyst is a result of such partial oxidation. It is known that steam at high temperatures sometimes acts as an oxidizing agent. The flow of steam or air through the bed of catalyst during the treatment apparently results in better penetration of the catalyst granules by the vapors than is obtained by heating in contact with the non-flowing vapor and thus facilitates an increase in catalytic selectivity of the entire granule. However, the invention is not restricted by these, or any other, theories in explanation of the results obtained.

In the treatment, the carbon-free catalyst is heated in contact with steam and/or an oxygen-containing gas such as air or oxygen at the aforementioned temperatures of from 650° to 800° C., preferably from 675° to 750° C., for at least 1 hour and usually from 5 to 50 hours at the preferred temperatures. When the heat-treatment is carried out while passing air or other oxygen-containing gas through the catalyst, the increase in catalyst selectivity that occurs in the first day, or thereabout, of the treatment sometimes is followed by a gradual decrease in catalyst selectivity, apparently due to over-oxidation of the catalyst. Accordingly, such heat-treatment of the catalyst in a current of air, or a mixture of steam and air, is preferably carried out in from 5 to 30 hours at temperatures in the range of from 675° to 750° C. When using steam as the gas in contact with the catalyst, the initial increase in catalyst selectivity has not been followed by an appreciable decrease in selectivity, and the heat-treatment with steam can apparently be continued as long as desired. In practice it is carried out at the above-mentioned preferred temperatures in from 5 hours to 3 days, and usually in from 10 to 48 hours. Steam is preferably passed through the catalyst bed during the heat-treatment.

Such heat-treatment of a freshly-formed, carbon-free catalyst improves its selectivity in catalyzing the thermal dehydrogenation, rather than a thermal cracking or carbonization, of normal butylenes in the presence of steam. Use of the heat-treated catalyst for the dehydrogenation of normal butylenes to make butadiene avoids considerable losses of butylenes due to side-reactions such as cracking of the butylenes or butadiene into hydrocarbons of lower molecular weight, e. g. methane or ethylene, which occur during the first month or thereabout of use in the reaction of a newly-prepared calcium nickel phosphate catalyst that has not been given the preliminary heat-treatment of the invention. The preliminary heat-treatment of a newly-prepared calcium nickel phosphate catalyst gives it an effectiveness, i. e. a combination of selectivity and activity when first used in catalyzing the dehydrogenation of butylenes, that is as great as, and usually is greater than, that attained by a calcium nickel phosphate catalyst (which has not been given the preliminary heat-treatment) after it has been used for a month or more in the dehydrogenation process.

The heat-treatment of the invention can be applied to improve the selectivity, and in some instances the activity, of a calcium nickel phosphate catalyst that has become partially spent, or has decreased in selectivity, as a result of long use in the dehydrogenation process. Prior to the heat-treatment of the invention, it was necessary that the catalyst be freed of any carbon or carbonaceous accumulations. This is accomplished in conventional manner, e. g. in the burning-off step of the dehydrogenation process.

By periodically, e. g. at from one to three month intervals, interrupting the process for the dehydrogenation of butylene in the presence of steam and a calcium nickel phosphate catalyst and heat-treating the catalyst by the method of this invention, the over-all yield of butadiene from the dehydrogenation may be increased and the active life of the catalyst be lengthened.

The following examples describe ways in which the invention has been practiced and illustrate certain of its advantages, but are not to be construed as limiting its scope. In the examples, the volumes of gas or vapor which are given are those which it is calculated that the gas or vapor would occupy at 0° C. and 760 mm. pressure. Rates of flow of a gas or vapor through a bed of catalyst are expressed as "space velocities." Each space velocity is the liters of gas or vapor (expressed as at 0° C. and 760 mm. pressure) fed to a catalyst bed per liter of the bed per hour.

EXAMPLE 1

A freshly-prepared granular dehydrogenation catalyst (consisting essentially of an intimate mixture of 2 percent by weight of chromic oxide and 98 percent of calcium nickel phosphate containing an average of approximately 8.5 atoms of calcium per atom of nickel) was tested, heat-treated, and further tested as follows. A bed of the catalyst was flushed free of air with steam after which a vapor mixture of 1 part by volume of normal butylenes (a mixture of 1-butylene and 2-butylene) of 96.8 percent purity and approximately 20 parts of steam was passed through the bed at a temperature of approximately 650° C. for 28 minutes. Approximately 0.94 gram molecular weight of butylene was fed to the bed in this period. Vapors flowing from the bed were passed successively through a water-cooled condenser and a trap cooled with ice to remove most of the water vapor, then through a bed of solid calcium chloride and finally through a trap cooled with a solid carbon dioxide and acetone mixture where hydrocarbons having 3 or more carbon atoms in the molecule were condensed and collected. The condensate was weighed and analyzed for butadiene. The volume of the gases remaining uncondensed was measured. It may be mentioned that the volume of uncondensed gaseous products varies inversely with the selectivity of the catalyst in causing the dehydrogenation to form butadiene rather than side reactions such as cracking and carbonization of the hydrocarbons, i. e. a catalyst of low selectivity causes formation of a larger volume of uncondensed gas than is obtained by similar use of a catalyst of high selectivity. The amount of butadiene in the condensate was estimated by multiplying the weight of the condensate by the proportion of butadiene therein. Since the condensate comprises unreacted butylenes and also a small proportion of $C_3$ hydrocarbons, e. g. propylene, the value obtained is only an approximation. However, it is sufficiently accurate for comparison of the effectiveness of the catalyst for the production of butadiene in one cycle of the dehydrogenation process with its effectiveness for the same purpose in another cycle. After feeding the vapor mixture of steam and butylenes to the catalyst bed for the 28 minute period, the flow of butylenes was interrupted and steam alone was passed through the bed for two minutes. Air was then admixed with the inflowing steam and passed into the catalyst bed at a rate corresponding to 700 liters of air (expressed as at 0° C. and 760 mm. pressure) per liter of the catalyst bed per hour. The steam and air mixture was passed through the catalyst bed, at approximately 650° C., for 28 minutes for purpose of oxidizing and removing carbonaceous deposits from the bed. Air was then flushed from the bed by passing steam alone into the bed for 2 minutes. This one hour cycle of operations (i. e. of passing a mixture of steam and butylenes through the catalyst bed for 28 minutes, flushing the bed with steam for 2 minutes, passing the steam and air mixture through the bed for 28 minutes, and again flushing the bed with steam for 2 minutes) was repeated twice. The flow of steam was then interrupted and the catalyst was heated to 750° C. for 16 hours without passing steam, or any other gas, through the bed. The catalyst was then employed in three more cycles of the above-described process for the production, at a reaction temperature of 650° C., of butadiene. Air alone was then passed through the catalyst bed for 15 hours at a temperature of about 750° C. The catalyst bed was then flushed free of air with steam, after which it was employed in five more cycles of the dehydrogenation process. Table I indicates the successive cycles of the dehydrogenation process that were carried out and the heat-treatments that the catalyst was given between certain of said cycles. The table also gives the liters of uncondensed gas (expressed as at 0° C. and 760 mm. pressure), the grams of product collected as condensate, and the mole percent of butadiene in the condensate, for each cycle of the dehydrogenation process. It also gives the approximate weight, in grams, of butadiene obtained in each cycle of the dehydrogenation process. In the table, 1,3-butadiene is indicated by its empirical formula, $C_4H_6$.

Table I

| Intervening Heat Treatments | Dehydrogenation Process | | | |
|---|---|---|---|---|
| | Cycle | Uncondensed Gas, Liters | Condensate | $C_4H_6$, gms. |
| | | | gms. | $C_4H_6$, mole Percent | |
| | 1 | 234.17 | 5.15 | 15.0 | 0.8 |
| | 2 | 207.79 | 8.67 | 21.0 | 1.8 |
| | 3 | 221.00 | 6.72 | 4.8 | 0.3 |
| 14 Hrs. at 750° C.; no Gas Flow. | | | | | |
| | 4 | 43.57 | 43.33 | 33.0 | 14.3 |
| | 5 | 193.37 | 11.66 | 5.4 | 0.6 |
| | 6 | 205.71 | 5.99 | 17.0 | 1.0 |
| 15 Hrs. at 750° C.; in Current of Air. | | | | | |
| | 7 | 17.17 | 46.38 | 39.2 | 18.2 |
| | 8 | 20.82 | 47.85 | 36.6 | 17.5 |
| | 9 | 23.17 | 46.59 | 34.0 | 15.8 |
| | 10 | 26.26 | 45.90 | 35.6 | 16.3 |
| | 11 | 28.71 | 46.11 | 34.4 | 15.9 |

Cycles 1–3 of the table show that the catalyst was highly active, but possessed poor selectivity and poor effectiveness for the production of butadiene, when it was first placed in service. Cycle 4 shows that the heat-treatment, between cycles 3 and 4, of the catalyst without passage of steam or other gas through the catalyst bed reduced the wildness of the catalyst and rendered it highly effective and selective in catalyzing the dehydrogenation of the normal butylenes to form butadiene. Cycles 5 and 6 show that the improvements in catalyst behavior that resulted from such heat-treatment were short lived. Cycles 7–11 show that the heat-treatment, between cycles 6 and 7, of the catalyst in a current of air caused similar and more durable improvements in the selectivity and effectiveness of the catalyst. Apparently the improvements accomplished by the heat-treatment between cycles 3 and 4 was short-lived because of an insufficient supply of an oxidizing gas, i. e. steam. Even a slow passage of steam or air through the catalyst during the heat-treatment provides ample oxygen for modification of the entire catalyst and results in more durable improvements in the catalyst properties.

EXAMPLE 2

A portion of another batch of a newly-prepared calcium nickel phosphate catalyst, containing 2 percent by weight of chromic oxide and of substantially the same chemical composition as that used in Example 1, was tested in one cycle of a process for the dehydrogenation of normal butylenes to form butadiene and then heat-treated in accordance with the invention. It was again tested in the dehydrogenation process, further heat-treated, and again tested. Except for the conditions employed in the heat-treatments, the procedure in carrying out, and determining the results of, these operations was substantially as described in Example 1. However, each heat-treatment was carried out at a temperature of 650° C. while passing air through the bed of catalyst. Each heat-treatment was preceded by the step, in the dehydrogenation process, of oxidizing and removing carbonaceous material from the catalyst. Table II indicates the kinds and order of the operations that were carired out and expresses the results in the same way as in Example 1.

Table II

| Intervening Heat Treatments | Dehydrogenation Process | | | |
|---|---|---|---|---|
| | Cycle | Uncondensed Gas, Liters | Condensate | $C_4H_6$, gms. |
| | | | gms. | $C_4H_6$, mole Percent | |
| With Air at 650° C., for 16 Hrs. | 1 | 179.93 | 9.6 | 15.0 | 1.4 |
| | 2 | 25.54 | 42.5 | 45.0 | 19.1 |
| | 3 | 29.00 | 44.8 | 41.4 | 18.5 |
| | 4 | 39.97 | 44.1 | 32.0 | 14.1 |
| | 5 | 30.38 | 44.3 | 38.6 | 17.1 |
| | 6 | 35.32 | 42.8 | 34.2 | 14.6 |
| | 7 | 30.63 | 42.4 | 33.6 | 14.2 |
| With Air At 650° C., for 15.5 Hrs. | | | | | |
| | 8 | 20.50 | 44.4 | 44.6 | 19.8 |
| | 9 | 20.50 | 46.1 | 44.6 | 20.6 |
| | 10 | 20.21 | 45.6 | 43.0 | 19.6 |
| | 11 | 20.08 | 46.2 | 41.6 | 19.2 |
| | 12 | 19.34 | 46.9 | 41.0 | 19.2 |
| With Air At 650° C., for 15 Hrs. | | | | | |
| | 13 | 18.34 | 45.8 | 45.0 | 20.6 |

EXAMPLE 3

A freshly-prepared granular catalyst, having the composition given in Example 1, was tested for the dehydrogenation of normal butylenes to form butadiene, heat-treated in accordance with the invention, and again tested in the dehydrogenation process. The heat-treatment was carried out immediately after the conventional operation, in the dehydrogenation process, of removing carbonaceous material from the catalyst by passing a heated mixture of steam and air through the catalyst bed and was accomplished by discontinuing the feed of air and passing steam alone through the bed at a space velocity of 6,000 and a temperature of approximately 650° C. for 15.5 hours. Otherwise, the several operations of this experiment were similar to those described in Example 1. The results are expressed in the same way as in Example 1.

*Table III*

| Heat Treatment | Dehydrogenation Process | | | | |
|---|---|---|---|---|---|
| | Cycle | Uncondensed Gas, Liters | Condensate | | $C_4H_6$, gms. |
| | | | gms. | $C_4H_6$, mole Percent | |
| With Steam at 650° C. For 15 Hrs. | 1 | 44.47 | 36.8 | 43.0 | 15.8 |
| | 2 | 30.50 | 43.6 | 46.6 | 20.0 |
| | 3 | 20.16 | 45.9 | 41.4 | 18.6 |
| | 4 | 23.64 | 46.5 | 39.4 | 18.3 |
| | 5 | 20.29 | 46.9 | 40 | 18.8 |

EXAMPLE 4

This example demonstrates that the heat-treatment of the invention is satisfactorily effective in improving the selectivity of a calcium nickel phosphate catalyst (for causing the dehydrogenation of normal butylenes rather than occurrence of side reactions) only when the catalyst is substantially free of carbon and carbonaceous material at the time of the heat-treatment. This example also shows that the heat-treatment can be applied to improve the properties of such catalyst after the latter has decreased in selectivity and activity through extensive use in a dehydrogenation process. The granular catalyst which was employed was of the same composition as that in Example 1, i. e. it was a calcium nickel phosphate having 2 percent by weight of chromic oxide intimately admixed therewith. It had been used extensively in a process for the production of butadiene from normal butylenes. Apparently because of improper use in such process, it had decreased in selectivity and activity to an extent rendering it unsuitable for further employment and had accumulated approximately 0.08 percent by weight of carbon, or a carbonaceous material, in and on the granules. One portion of this used catalyst was heat-treated by passing steam at a temperature of 750° C. and a space velocity of 6,000 through the same for 24 hours. The treated catalyst was then tested in a process for the dehydrogenation of normal butylenes to form butadiene. The test was carried out by passing a mixture of 1 part by volume of normal butylenes (a mixture of 1-butylene and 2-butylene) and 20 parts of superheated steam through a 150 cc. bed of the catalyst at a space velocity of 6,300. The vapors flowing from the bed were cooled, as in Example 1, to condense and collect the hydrocarbons having 3 or more carbon atoms in the molecule and the condensate was weighed and analyzed for butadiene. For purpose of estimating the selectivity of the catalyst, i. e. the percent yield of butadiene on the consumed butylene, assumption was made that the condensate consisted of the butadiene and unreacted butylenes and the yield was calculated on this basis. Gaseous products that remained uncondensed were collected and measured for volume. In each cycle of operations involved in the test, the heated vapor mixture was passed through the catalyst bed for 28 minutes, the bed was purged by continued flow of the steam alone for 2 minutes, air was admixed with the inflowing steam to form a vapor mixture containing about 7.5 parts by volume of steam per part of air and this mixture was passed through the catalyst bed for 28 minutes to oxidize and remove any carbon or carbonaceous material from the bed, and the bed was purged of air by passing the steam alone through the bed for 2 minutes. In each of these operations, the catalyst bed and the vapors flowing through the same were heated to about 575° C. In the first cycle of the dehydrogenation process, using the heat-treated catalyst, the volume of uncondensed gaseous products was 14.6 liters (expressed as at 0° C. and 760 mm. pressure) and the catalyst selectivity (i. e. the estimated percent yield of butadiene based on the amount of butylene consumed) was less than 40 percent. In the second cycle, the volume of uncondensed gas was 47.2 liters and the catalyst selectivity remained as less than 40 percent. In view of these poor results, the test was discontinued. Clearly, the heat-treatment of the catalyst while it contained an appreciable amount of carbon was not satisfactorily effective in improving the selectivity of the catalyst.

Steam superheated to 750° C. was passed, for 24 hours and at the above-mentioned steam flow-rate, through another 150 cc. portion of the used catalyst containing 0.08 weight percent of carbon. At one hour intervals during this period, small amounts of air were admixed with the inflowing steam, the total amount of air thus introduced being that theoretically required for oxidation and removal of the carbon as carbon dioxide. Due to occurrence of the water gas reaction, the carbon was actually oxidized and removed in less than 24 hours; probably in about 20 hours. The catalyst was then employed in five successive cycles of the above-described test at a reaction temperature of 575° C. to determine its effectiveness in dehydrogenating normal butylenes to make butadiene. The following results were obtained.

*Table IV*

| Cycle No. | Uncondensed Gaseous Products, Liters | Estimated Percent Selectivity of Catalyst |
|---|---|---|
| 1 | 5.0 | 73 |
| 2 | 7.0 | 54 |
| 3 | 9.4 | <40 |
| 4 | 11.5 | <40 |
| 5 | 9.9 | <40 |

From these results it is evident that heating of the catalyst during oxidation of the carbon contained therein is not effective in accomplishing the purpose of the invention and that the heat-treatment does not become effective in improving the selectivity of the catalyst until after the carbon has been removed from the latter.

A vapor mixture of one part by volume of air and 7.5 parts of steam was passed, at a temperature of 650° C. and a space velocity of 6,300 through another 150 cc. bed of the used carbon-containing catalyst. The steam and air mixture was passed through the bed for 6 hours, i. e. until the carbon had been oxidized and removed from the catalyst. Steam preheated to 750° C. was then passed through the bed of catalyst at a space velocity of 6,000 for 24 hours. After completion of this heat-treatment, the catalyst was tested in five successive cycles of the above-described process for the dehydration of normal butylenes at a reaction temperature of 575° C. and then in another five successive cycles carried out similarly except with the catalyst and the vapors flowing through the same at a temperature of approximately 650° C. The results of this test were determined as in the preceding experiments. The catalyst was again heat-treated by passing steam alone over the same at a temperature of 750° C. for 24 hours, after which it was again tested, as just described, to determine its effectiveness in catalyzing the dehydrogenation of normal butylenes to form butadiene. The successive operations that were carried out after freeing the catalyst of carbon, and the results of the tests of the catalyst, are summarized in Table V.

Table V

| Operation | | Dehydrogenation Tests | | | |
|---|---|---|---|---|---|
| No. | Kind | Cycle No. | Reaction Temp., °C. | Uncondensed Gas, Liters | Percent Selectivity of Catalyst |
| 1 | 24 Hr. Heat-Treatment With Steam. | | | | |
| 2 | Test | 1 | 575 | 4.1 | 94.5 |
| 3 | do | 2 | 575 | 4.2 | 89.5 |
| 4 | do | 3 | 575 | 4.1 | 90.0 |
| 5 | do | 4 | 575 | not measured | |
| 6 | do | 5 | 575 | 4.0 | 89.5 |
| 7 | do | 6 | 650 | 10.2 | 86.5 |
| 8 | do | 7 | 650 | 12.2 | 76 |
| 9 | do | 8 | 650 | 14.4 | 61 |
| 10 | do | 9 | 650 | 16.9 | 47 |
| 11 | do | 10 | 650 | 18.0 | <40 |
| 12 | 24 Hr. Heat-Treatment With Steam. | | | | |
| 13 | Test | 1 | 575 | 4.6 | 85.5 |
| 14 | do | 2 | 575 | 4.3 | 91 |
| 15 | do | 3 | 575 | 4.3 | 90.5 |
| 16 | do | 4 | 575 | 4.4 | 90.5 |
| 17 | do | 5 | 575 | 4.3 | 90.5 |
| 18 | do | 6 | 650 | 9.9 | 90 |
| 19 | do | 7 | 650 | 9.8 | 89.5 |
| 20 | do | 8 | 650 | 10.0 | 88 |
| 21 | do | 9 | 650 | 10.9 | 83.5 |
| 22 | do | 10 | 650 | 10.6 | 81 |

These tests show that after the used catalyst has been freed of carbon, the heat-treatment of the invention is effective in improving the selectivity of the catalyst.

EXAMPLE 5

Catalyst pellets were prepared by admixing 98 parts by weight of calcium nickel phosphate, containing an average of 8.5 atoms of calcium per atom of nickel, 2 parts of chromic oxide and 4 parts of an oil which served as a binder and was capable of being removed either by vaporization or by oxidation, and pressing the mixture to form the pellets. A portion of the pellets, which were of a size suitable for use as a granular catalyst, was heated in a current of nitrogen at temperatures which were raised from 100° to 500° C. during a 5 hour heating period, whereby the binder was vaporized and removed from the catalyst granules. Another portion of the pellets was heated at 750° C. for 6 hours in a stream of a vapor mixture of 7.5 parts by volume of steam and one part of air to oxidize and remove the binder. A 150 cc. portion of the granular catalyst which had been heated to vaporize and remove the binder was tested by a standard procedure hereinafter described to determine its effectiveness as a catalyst for the dehydrogenation of normal butylenes to form butadiene. A 150 cc. portion of the granular catalyst that had been freed of the binder by treatment with the mixture of steam and air was similarly tested. Separate 150 cc. portions of granular catalyst that had been freed of the binder in the respective ways just mentioned were each heated at 700° C. for 24 hours in a current of steam having a space velocity of 6,000. They were then separately tested to determine their effectiveness in catalyzing the dehydrogenation of normal butylenes to form butadiene. The standard procedure in carrying out each such test for effectiveness of a catalyst was as described in Example 4, except that the catalyst was employed in 10 successive cycles of the dehydrogenation process and in the first 5 of these cycles the catalyst and the vapors flowing through the same were heated at a temperature of about 575° C., whereas in the last 5 of the cycles the temperature of the catalyst and the vapors in contact therewith was approximately 650° C. Vapors flowing from the catalyst bed in the dehydrogenation step of each cycle were cooled, dried and further cooled to condense and collect the hydrocarbons having 3 or more carbon atoms in the molecule, and the uncondensed gaseous products were collected and measured for volume. The condensate was weighed and analyzed to determine its content of butadiene. On a basis of this data, the percent selectivity of the catalyst in causing the dehydrogenation rather than side reactions, i. e. the percent yield of butadiene based on consumed butylenes, was estimated as in preceding examples. Table VI identifies each of the above-mentioned portions of catalyst by indicating whether the binder was removed by vaporization or by oxidation and whether, after removal of the binder, the catalyst was subjected to the 24 hours of heat-treatment with steam before being tested to determine its effectiveness. The table gives, for each of the portions of catalyst, the average volume of uncondensed gaseous products obtained per cycle when operating at the respective temperatures of 575° and 650° C., the average value for the percent of butadiene in the liquified, i. e. condensed, products obtained at said respective temperatures, and the average percent selectivity value for the catalyst at said respective temperatures.

Table VI

| Run No. | Pretreatment of Catalyst | | Test of Catalyst | | | |
|---|---|---|---|---|---|---|
| | Binder Removed By— | Heat-Treated | Reaction Temp., °C. | Uncondensed Gas, Liters Per Cycle | Percent C₄H₆ In Condensate | Catalyst Selectivity, Percent |
| 1 | Oxidation | No | 575 | 6.4 | 22.4 | 90.5 |
| | | | 650 | 13.5 | 45.1 | 88.5 |
| 2 | do | Yes | 575 | 4.3 | 17.5 | 95.5 |
| | | | 650 | 9.0 | 35.3 | 94.5 |
| 3 | Vaporization | No | 575 | 2.4 | 7.5 | 83.0 |
| | | | 650 | 12.3 | 38.8 | 86.0 |
| 4 | do | Yes | 575 | 3.0 | 12.5 | 93.0 |
| | | | 650 | 6.9 | 31.1 | 98.5 |

EXAMPLE 6

A granular catalyst having the composition given in Example 1, i. e. consisting of 98 weight percent of calcium nickel phosphate and 2 percent of chromic oxide, which catalyst had been used extensively in the manufacture of butadiene and had decreased in selectivity to an extent such that it was poorly suited for further use, was freed of accumulated carbonaceous impurities by the usual operation of oxidizing the impurities with a mixture of steam and air. A portion of the carbon-free catalyst was tested directly, as in Example 5, to determine its effectiveness in dehydrogenating normal butylenes to form butadiene. Another portion of the carbon-free catalyst was heated at 700° C. for 24 hours in a current of steam flowing at a space velocity of 6,000, and was then similarly tested to determine its effectiveness in dehydrogenating normal butylenes to form butadiene. However, after the usual 10 cycles of operation in this test, the dehydrogenation process was continued at a reaction temperature of 650° C. for another 24 cycles, and test data was collected in the last 5 cycles, i. e. in cycles 30–34, and averaged. Table VII identifies each portion of catalyst by indicating whether it was given the 24 hour heat-treatment with steam before being tested. The results of the tests are given as average values per cycle in specified five-cycle periods of the dehydrogenation process at the respective reaction temperatures of 575° and 650° C. and are expressed as in Example 5.

Table VII

| Run No. | Catalyst Heat-Treated | Cycles | Test of Catalyst | | | |
|---|---|---|---|---|---|---|
| | | | Reaction Temp., °C. | Uncondensed Gas, Liters | Percent C₄H₆ In Condensate | Catalyst Selectivity, Percent |
| 1 | No | 1–5 | 575 | 2.1 | 5.0 | 70.5 |
| | | 6–10 | 650 | 7.3 | 15.6 | 65.0 |
| 2 | Yes | 1–5 | 575 | 2.9 | 9.6 | 87.0 |
| | | 6–10 | 650 | 6.3 | 20.2 | 86.0 |
| | | 30–34 | 650 | 5.9 | 20.3 | 89.5 |

EXAMPLE 7

A portion of a newly-prepared, carbon-free, granular catalyst consisting of calcium nickel phosphate containing an average of approximately 8.5 atoms of calcium per atom of nickel, was tested directly, as described in Example 5, to determine its effectiveness in catalyzing the dehydrogenation of normal butylenes to form butadiene. The first five cycles of the dehydrogenation process were carried out at a reaction temperature of approximately 575° C. and the next five cycles at 650° C. Another portion of the carbon-free catalyst was heated at a temperature of 700° C. in a current of steam for 24 hours. It was then similarly tested. Table VIII identifies each portion of the catalyst by indicating whether it was given the 24 hour heat-treatment at 700° C. in steam. It gives the average values (for the liters of uncondensed gaseous products, grams of condensed products, mole percent of butadiene in the condensate, grams of butadiene formed, and percent selectivity of the catalyst) obtained per cycle in the five operating cycles carried out at 575° C. and in the five cycles carried out at 650° C. with the above-mentioned respective portions of catalyst.

*Table VIII*

| Test No. | Catalyst Heat Treated | Dehydrogenation Process | | | | | | |
|---|---|---|---|---|---|---|---|---|
| | | Cycles | Reaction Temp., °C. | Average Values/Cycle For— | | | | |
| | | | | Uncondensed Gas, Liters | Condensate | | $C_4H_6$, gms. | Estimated Selectivity of Catalyst, percent |
| | | | | | gms. | $C_4H_6$, mole percent | | |
| 1 | No | 1–5 | 575 | 5.9 | 50.3 | 20.1 | 10.1 | 89.4 |
| | | 6–10 | 650 | 11.7 | 49.8 | 43.1 | 21.1 | 92.1 |
| 2 | Yes | 1–5 | 575 | 4.4 | 51.8 | 18.8 | 9.5 | 96.7 |
| | | 6–10 | 650 | 9.0 | 51.0 | 36.5 | 18.2 | 95.8 |

We claim:

1. A method which comprises heating a calcium nickel phosphate catalyst, which contains an average of from 6.5 to 12 atoms of calcium per atom of nickel and is substantially free of carbonaceous material, at a temperature of from 650° to 800° C. in contact with at least one gas of the class consisting of steam, oxygen, and air for a time of at least 5 hours and sufficient to increase the selective activity of the catalyst, for catalyzing the thermal dehydrogenation of a normal butylene in the presence of steam to form butadiene rather than catalyzing side reactions, over the selective activity initially possessed by the catalyst.

2. A method, as claimed in claim 1, wherein the calcium nickel phosphate is one containing an average of from 7.5 to 9.2 atoms of calcium per atom of nickel and the gas is passed through a bed of the same for at least 5 hours while heating it at temperatures of from 675° to 750° C.

3. A method, as claimed in claim 2 wherein the gas that is passed through the bed of catalyst during heating of the latter consists essentially of steam.

4. A method which comprises heating a carbon-free catalyst, consisting essentially of a major proportion by weight of a calcium nickel phosphate containing an average of from 7.5 to 9.2 atoms of calcium per atom of nickel and a minor proportion of chromium oxide, at temperatures of from 675° to 750° C. for at least 5 hours while passing steam over, and in contact with, the catalyst, whereby the selective activity of the catalyst for catalyzing the thermal dehydrogenation of a normal butylene in the presence of steam to form butadiene rather than catalyzing side-reactions is improved.

References Cited in the file of this patent

UNITED STATES PATENTS

| 2,113,654 | Ipatieff | Apr. 12, 1938 |
| 2,456,367 | Britton et al. | Dec. 14, 1948 |
| 2,456,368 | Britton et al. | Dec. 14, 1948 |
| 2,542,813 | Heath | Feb. 20, 1951 |